US012697514B2

(12) United States Patent    (10) Patent No.:   US 12,697,514 B2

Zhu et al.      (45) Date of Patent:    Aug. 4, 2026

(54) RELIEF APPARATUS FOR MOBILITY AND SUSPENSION MITIGATION

(71) Applicant: HONEYWELL SAFETY PRODUCTS USA, INC., Charlotte, NC (US)

(72) Inventors: Xiaojuan Zhu, Charlotte, NC (US); Peng Zhou, Charlotte, NC (US); Ling Lin, Charlotte, NC (US); Zheng Gu, Charlotte, NC (US); Wenbo Wang, Charlotte, NC (US); Lyndon Liu, Charlotte, NC (US)

(73) Assignee: Honeywell Safety Products USA, Inc., Latham, NY (US)

( * ) Notice: Subject to any disclaimer, the term of this patent is extended or adjusted under 35 U.S.C. 154(b) by 1023 days.

(21) Appl. No.: 17/811,190

(22) Filed: Jul. 7, 2022

(65) Prior Publication Data

US 2023/0022288 A1    Jan. 26, 2023

(30) Foreign Application Priority Data

Jul. 22, 2021   (CN) .......................... 202110831295.7

(51) Int. Cl.
*A62B 35/00*      (2006.01)
*F16G 11/00*      (2006.01)

(52) U.S. Cl.
CPC .......... *A62B 35/0025* (2013.01); *F16G 11/00* (2013.01)

(58) Field of Classification Search
CPC ............ A62B 35/0025; A62B 35/0031; A62B 35/0075; A62B 35/04; F16G 11/00
See application file for complete search history.

(56) References Cited

U.S. PATENT DOCUMENTS

| | | | | | |
|---|---|---|---|---|---|
| 4,992,629 | A | * | 2/1991 | Morais | H02G 15/007 |
| | | | | | 267/74 |
| 5,332,071 | A | * | 7/1994 | Duncan | E04G 21/3295 |
| | | | | | 267/74 |
| 7,104,371 | B2 | * | 9/2006 | Renton | A62B 35/04 |
| | | | | | 188/371 |

(Continued)

FOREIGN PATENT DOCUMENTS

EP      3332840 A1    6/2018

OTHER PUBLICATIONS

European search report Mailed on Mar. 2, 2023 for EP Application No. 22183819.

*Primary Examiner* — Daniel P Cahn
(74) *Attorney, Agent, or Firm* — Fredrikson & Byron, P.A.

(57)      ABSTRACT

A relief apparatus and method of use for providing a flexible connection point between straps of a harness and mitigating suspension trauma for a user of the harness. In various embodiments, the relief apparatus comprises a base plate comprising one or more base strap slots and a central cavity defined by a cavity wall protruding out of a plane of the base plate, and an upper plate comprising one or more upper strap slots and an aperture configured to fit around the cavity wall of the base plate. The base plate and the upper plate are arrange concentrically along a central axis and may be configured to each rotate about the central axis. The relief apparatus further comprises a relief step comprised of a line and having a proximal end and a distal end, the distal end being secured to a deployment feature.

20 Claims, 12 Drawing Sheets

(56) References Cited

U.S. PATENT DOCUMENTS

| 8,608,142 B2 * | 12/2013 | Von Allmen ............ F16F 7/128 |
| | | 267/170 |
| 9,937,367 B1 * | 4/2018 | Huang ............... A62B 35/0025 |
| 10,022,573 B2 * | 7/2018 | Jones ....................... F16F 7/123 |
| 2005/0067222 A1 * | 3/2005 | Casebolt ............ A62B 35/0037 |
| | | 182/30 |
| 2006/0005293 A1 * | 1/2006 | Frey ........................ A44B 11/14 |
| | | 2/44 |
| 2009/0019784 A1 * | 1/2009 | Tinker .................... E04G 11/04 |
| | | 52/741.1 |
| 2011/0315482 A1 * | 12/2011 | Griffiths ................... A62B 1/08 |
| | | 242/381.5 |
| 2014/0116354 A1 * | 5/2014 | Harris, II ............. A47D 13/086 |
| | | 119/796 |
| 2015/0189974 A1 * | 7/2015 | Bercaw ..................... A45F 3/04 |
| | | 224/633 |
| 2017/0246508 A1 * | 8/2017 | Bonnet .................. F16G 15/08 |
| 2019/0070443 A1 * | 3/2019 | Hetrich ............. A62B 35/0037 |
| 2021/0037953 A1 * | 2/2021 | Tekunoff ................. F16B 21/09 |

* cited by examiner

RELIEF APPARATUS FOR MOBILITY AND SUSPENSION MITIGATION

CROSS-REFERENCE TO RELATED APPLICATIONS

This application claims priority pursuant to 35 U.S.C. 119(a) to China Patent Application No. 202110831295.7, filed Jul. 23, 2021, which application is incorporated herein by reference in its entirety.

FIELD OF THE INVENTION

Various embodiments described herein relate generally to safety equipment or personal protective equipment (PPE), including full body harnesses, which may be used by first responders, other users who work on platforms situated at a height, and/or the like.

BACKGROUND

Safety harnesses are commonly used as part of a fall protection system for users subjected to the potential of a fall from a height. In some environments, full-body safety harnesses are required, in some examples, when working on platforms that are at a height of six feet or greater. Such harnesses typically include both an upper torso portion (having, for example, shoulder straps) and a lower torso or seat portion (having, for example, one or more leg straps and/or a seat strap). While working on such platforms or in such an environment, a worker using a harness (e.g., a user) may be required to move around, stand, squat or lean, and with such actions, the harness can become stiff and/or offer resistance to the movement. For example, different straps of the harness may intersect, tangle, rub, or otherwise hinder movement of a user.

Further, in the event of a fall, safety harnesses cause bodily harm to a user in the course of suspending the user. Such harm, or suspension trauma, includes the loss of circulation of blood in the legs of the user (e.g., due to constriction of the straps of the harness against the user's body, or otherwise understood as gravitational force compressing the user's body against straps of the harness). When uncorrected or unprevented, suspension trauma may lead to restriction of blood flow to the brain and other major organs, further resulting in unconsciousness, serious injury, and possibly death. Accordingly, there is a need in the art for increased mobility and flexibility in safety harnesses and for the mitigation or prevention of suspension trauma for a user when suspending in a harness.

BRIEF SUMMARY

Various embodiments are directed to an example relief apparatus providing mobility and flexibility to a harness and integrated with a relief step enabling a user of a harness to maintain blood circulation and thereby mitigating suspension trauma. Straps of a harness may attach to different components of the relief apparatus, and some components of relief apparatus are configured to pivot or rotate about a central axis to allow the straps of the harness to move through a wide range of angles within a perpendicular plane (e.g., orthogonal to the central axis). In some example applications, the relief apparatus may be configured for use at an intersection of straps of an upper body portion of a harness and straps of a lower body portion of the harness. In such applications, the relief apparatus then enables mobility and flexibility of an upper body portion of the harness and a lower body portion of the safety harness with respect to each other. For example, the relief apparatus may enable the upper body portion of the harness to pivot with respect to the lower body portion of the harness in an anterior direction and/or a posterior direction, such as during hip hinging movements of the user.

In various embodiments, the relief step integrated with the relief apparatus may be configured to provide support and to enhance blood circulation for a user suspended in a safety harness in the event of a fall. Specifically, the relief step may comprise portions which a user may use to step, stand, move, flex leg muscles, and/or the like to alleviate compression against the harness straps and to improve blood circulation. In various embodiments, the relief step is initially configured or positioned in a compact or stored state, and the relief apparatus may comprise a deployment mechanism configured to release the relief step into a deployed state when needed in the event of a fall.

According to an aspect of the present disclosure, a relief apparatus is provided. The relief apparatus includes a base plate including one or more base strap slots and a central cavity defined by a cavity wall protruding out of a plane of the base plate. The relief apparatus further includes an upper plate including one or more upper strap slots and an aperture configured to fit around the cavity wall of the base plate. The base plate and the upper plate are arranged concentrically along a central axis. The relief apparatus further includes a relief step comprised of a line and having a proximal end and a distal end, the distal end secured to a deployment feature.

In various embodiments, an outer perimeter of the cavity wall is substantially circular. In various embodiments, the cavity wall is disposed within the aperture of the upper plate, and each of the base plate and the upper plate are configured to rotate about the central axis. In various embodiments, a depth of the cavity wall along the central axis is greater than a depth of the upper plate, and the upper plate is arranged adjacently to the base plate such that a portion of the cavity wall protrudes past the upper plate. In various embodiments, the relief apparatus further includes a fixed ring arranged concentrically with the base plate and the upper plate and rigidly fixed to the portion of the cavity wall protruding past the upper plate limiting substantial translation of the upper plate along the central axis. In various embodiments, the base plate includes a base radial block and the upper plate includes an upper radial block, both the base radial block and the upper radial block being co-planar within a plane perpendicular to the central axis and constraining the rotation about the central axis of each of the base plate and the upper plate to a particular range of rotation angles.

In various embodiments, the one or more base strap slots are configured to secure one or more first straps of a harness to the base plate, and the one or more upper strap slots are configured to secure one or more second straps of a harness to the upper plate. In various embodiments, a length of the relief step is adjustable.

In various embodiments, the deployment feature is a deployment cap configured to interface with the cavity wall, and the proximal end of the relief step is secured to a portion of the base plate within the central cavity. In various embodiments, the deployment cap includes an interfacing cap feature protruding out of the deployment cap, the interfacing cap feature configured to interface with an inner perimeter of the cavity wall. In various embodiments, the interfacing cap feature includes threads matching with threads of the cavity wall. In various embodiments, an outer perimeter of the deployment cap includes a plurality of ridges providing leverage for forces acting to rotate the deployment cap. In various embodiments, the relief step is positioned in one of: (i) a compact state within the central cavity while the deployment cap is interfaced with the cavity wall, or (ii) an extended released state when the deployment cap is not interfaced with the cavity wall.

In various embodiments, the deployment feature is a deployment ring configured to fit around the cavity wall of the base plate, and the proximal end of the relief step is secured to a fixed ring rigidly fixed to portion of the cavity wall protruding past the upper plate. In various embodiments, the deployment ring comprises one or more ring notches each configured to interface with a wall block positioned on the cavity wall, the interfacing of a ring notch with the wall block limiting substantial rotation of the deployment ring about the central axis. In various embodiments, the relief apparatus further includes a spring positioned within the central cavity along the central axis, and a buckle button positioned within the central cavity along the central axis distal relative to the spring. The buckle button includes one or more button legs extending across a face of the deployment ring to limit substantial translation of the deployment ring along the central axis. In various embodiments, the one or more button legs are configured to retract to enable substantial translation of the deployment ring along the central axis. Retracting of the one or more button legs is responsive to a force acting upon the buckle button against the spring. In various embodiments, the buckle button is composed of a material with at least one of a flexible characteristic, a malleable characteristic, or an elastic characteristic, such that the one or more button legs may extend and retract more than once. In various embodiments, the relief step is positioned in one of: (i) a compact state wrapped around the cavity wall while the deployment ring is fitted around the cavity wall, or (ii) an extended released state when the deployment ring is not fitted around the cavity wall.

According to another aspect of the present disclosure, an apparatus providing a flexible connection point between straps of a harness is provided. The apparatus includes a base plate including one or more base strap slots and a central protrusion protruding out a plane of the base plate, the central protrusion being substantially circular. The apparatus further includes an upper plate including one or more upper strap slots and an aperture configured to fit around the central protrusion of the base plate. The base plate and the upper plate are arranged concentrically such that at least a portion of the central protrusion is positioned within the aperture, and the upper plate is configured to rotate about the central protrusion.

BRIEF DESCRIPTION OF THE SEVERAL VIEWS OF THE DRAWINGS

Reference will now be made to the accompanying drawings, which are not necessarily drawn to scale.

DETAILED DESCRIPTION

Figure 1:
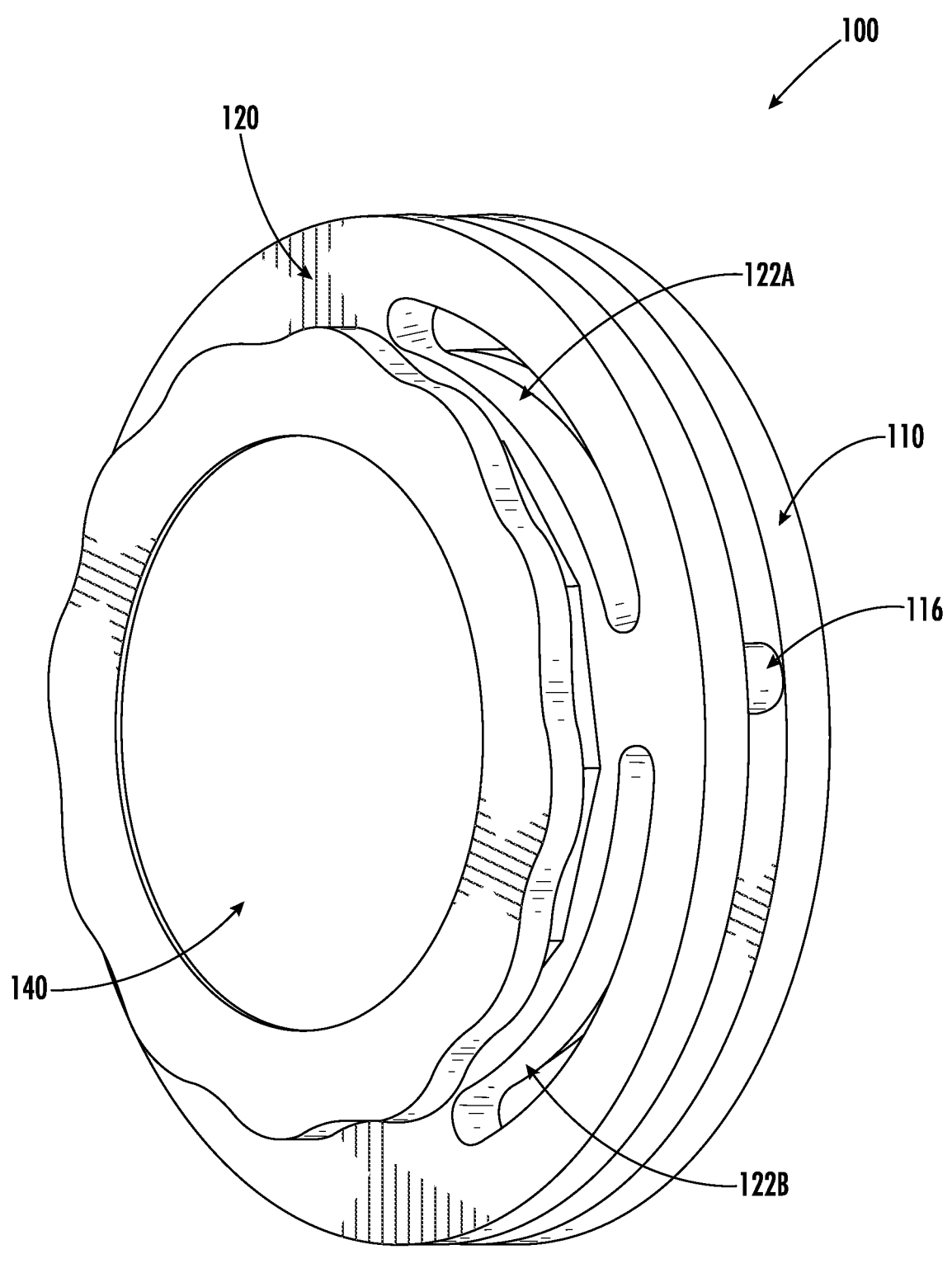
FIG. 1 illustrates a perspective view of an exemplary relief apparatus in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are described below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

As described herein, an example relief apparatus for improving mobility and flexibility for a harness is provided. Moreover, an example relief apparatus for providing physical relief to a user when suspended in the harness in the event of a fall is provided.

In various embodiments, the disclosed relief apparatus is configured for use with a full-body harness and a user of the full-body harness. Full-body harness, safety harnesses, harnesses, suspension devices, suspension systems, and/or similar terms used herein interchangeably are configured to protect a user from falls from dangerous heights. Typically, a harness is connected via a line to a secure point at or above a height at which the user is positioned, and in the event of a fall, tension of the line suspends the harness and the user in mid-air. Various harnesses are composed of various straps arranged and positioned in various configurations to secure and wrap around a user's body. Specifically, various harnesses may include an upper body portion and a lower body portion, where an upper body portion may include straps wrapped around a user's chest, shoulders, arms, and/or back while a lower body portion may include straps wrapped around a user's waist, hips, groin, pelvic region, legs, and/or the like.

To adequately support and suspend a user, the straps of a harness are connected to form a single harness unit. In some existing harnesses, buckles, belts, or buttons may be used to connect different straps. Such connections are rigid however, frequently preventing or actively resisting movement of the user in various directions. In further examples, folding, tearing, tangling, and/or the like of straps may result from the rigid connections.

In some instances, rigid and fixed connections of a harness hinder or restrict movement and actions that a user of the harness wishes to perform. For example, a user may wish or need to perform a hip hinging movement, such as bending over to pick up an object. However, such a movement may be hindered or restricted by a rigid and fixed connection between straps of an upper body portion of the harness and straps of a lower body portion of the harness. For instance, the straps of the upper body portion of the harness may be pulled taut during the hip hinging movement and limit the range to which the user may bend over.

Further, suspension trauma to a user of a harness may occur while the user is suspended by the harness in mid-air in the event of a fall. Straps of the harness that are wrapped around portions of the user's body may tighten and constrict as gravitational forces act on the user's body and tension is applied to various straps. Straps of a lower body portion of the harness especially may constrict or apply compression/pressure to the user's body, as such straps wrapped around the user's waist, hips, groin, hips, pelvic region, legs, and/or the like provide the main support for the user's body from falling. Such constriction leads to a cut-off of blood circulation for portions of the user's body (e.g., the user's legs), which may eventually lead to serious harm, injury, and/or death.

Various example embodiments of the present disclosure accordingly provide a flexible connection point between straps of a harness. Various embodiments of the present disclosure describe a relief apparatus to which various straps of a harness may be secured, thereby acting as a connection point. Different portions of the relief apparatus may rotate, move, translate, and/or the like relative to each other to provide the needed flexibility and freedom for straps secured to the relief apparatus.

While various straps are secured to the relief apparatus, the relief apparatus also enables the mitigation of suspension trauma for the user. In various embodiments, the relief apparatus includes a relief step, and the user of the harness may leverage physical force against the relief step. Such leverage enables a user to physically displace his/her body away from and/or off of particular straps that may be constricting, compressing, and/or the like the user's body. Thus, in some examples, various embodiments of the present disclosure provide relief apparatuses that serve as flexible connection points between straps of a harness and enable users of a harness to mitigate suspension trauma.

An Exemplary Relief Apparatus

According to various embodiments of the present disclosure, a first relief apparatus is provided. The first relief apparatus is configured with a first deployment mechanism for a relief step. That is, the relief step of the first relief apparatus may be initially positioned in a compact or stored state, and the first deployment mechanism of the first relief apparatus may be used to release or extend the relief step into a deployed state in which the user of a harness may use the relief step to mitigate suspension trauma. Various views of a first relief apparatus and components thereof are provided by FIGS. 1-7. It will be understood that terminology such as "first" should not be construed to assign implied meaning or to describe some advantage or preference over other relief apparatuses described herein.

Referring first to FIG. 1, a first relief apparatus 100 is illustrated. In various embodiments, the first relief apparatus 100 is comprised of a base plate 110, an upper plate 120, a fixed ring 130, and a deployment cap 140. The base plate 110, the upper plate 120, and the fixed ring 130, and the deployment cap 140 are adjacently arranged to form the first relief apparatus 100. In various embodiments, the first relief apparatus 100 is used with a harness such that the base plate 110 is positioned nearest the user's body and the deployment cap 140 is positioned furthest from the user's body. To provide an example reference orientation for the present description then, the base plate 110 may be considered the proximal-most component, while the deployment cap 140 is the distal-most component. In various embodiments, the first relief apparatus 100 is arranged with a proximal face of the upper plate 120 being adjacent to a distal face of the base plate 110 and a proximal face of the fixed ring 130 being adjacent to a distal face of the upper plate 120.

Figure 2:
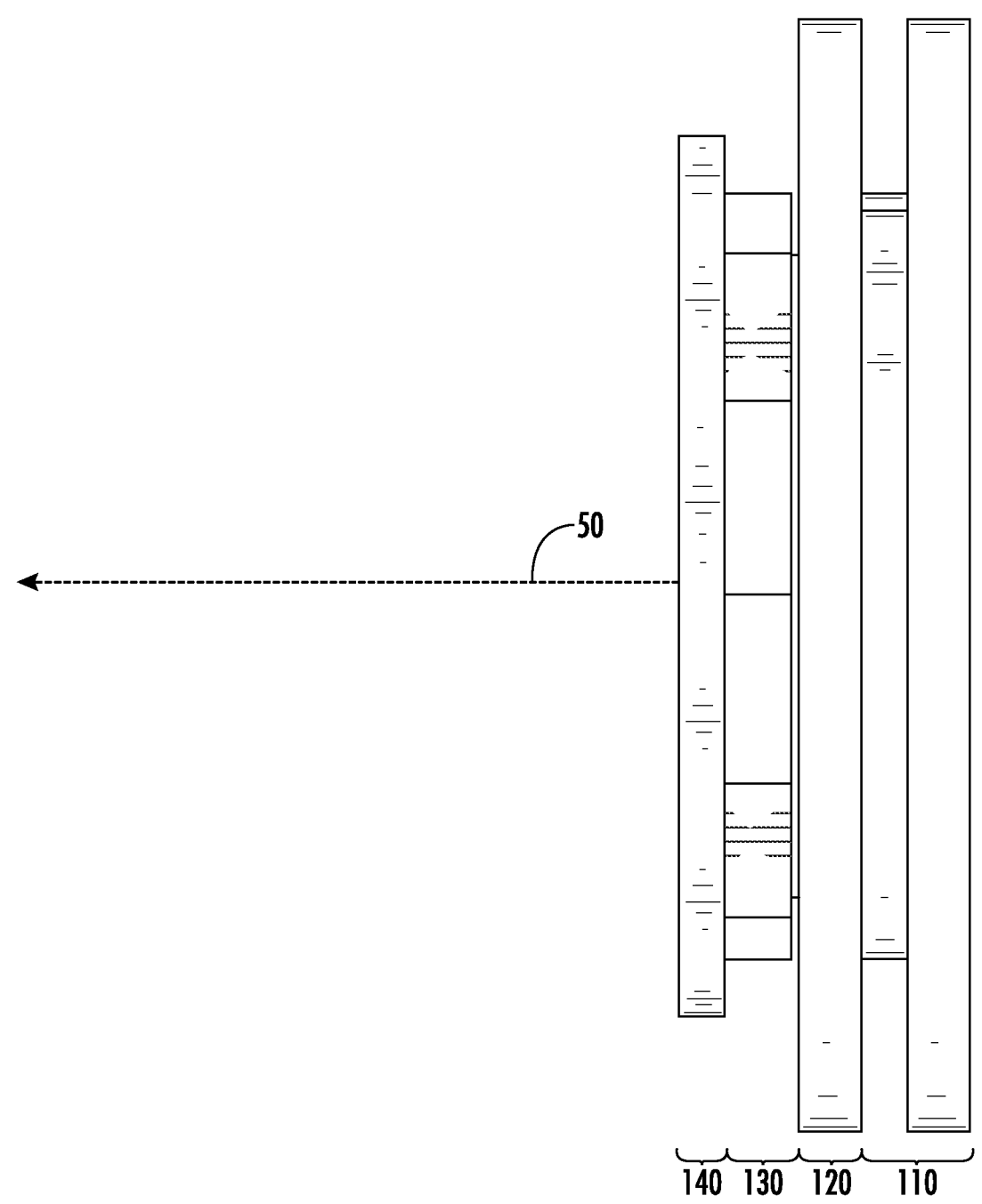
FIG. 2 illustrates a cross-sectional view of an exemplary relief apparatus in accordance with various embodiments.

In various embodiments, the base plate 110 and the upper plate 120 specifically provide the flexible connection point for various straps of a harness, while the deployment cap 140 integrates the first deployment mechanism for the first relief apparatus 100. In various embodiments, at least the base plate 110 and the upper plate 120 are substantially circular, as can be seen in FIGS. 1 and 2, and the first relief apparatus 100 may overall exhibit a substantially cylindrical shape. In other embodiments however, the outer perimeter of the base plate 110 and the upper plate 120 may be of any geometry, including rectangular, pentagonal, hexagonal, and/or the like.

Together, the base plate 110, the upper plate 120, the fixed ring 130, and the deployment cap 140 are concentrically aligned, as shown in FIG. 2. Specifically, a each of the base plate 110, the upper plate 120, the fixed ring 130, and the deployment cap 140 are arranged along a central axis 50. Referring again to the example orientation, a positive direction of the central axis 50 may be understood as projecting in a distal direction (away from a user's body), while a negative direction of the central axis 50 may be understood as projecting in a proximal direction (towards a user's body). Each of the base plate 110, the upper plate 120, the fixed ring 130, and the deployment cap 140 may be thin or substantially planarly-shaped. That is, each component may have a width (e.g., extending along an axis perpendicular to the central axis 50) greater than a depth (e.g., extending along the central axis 50).

Figure 3:
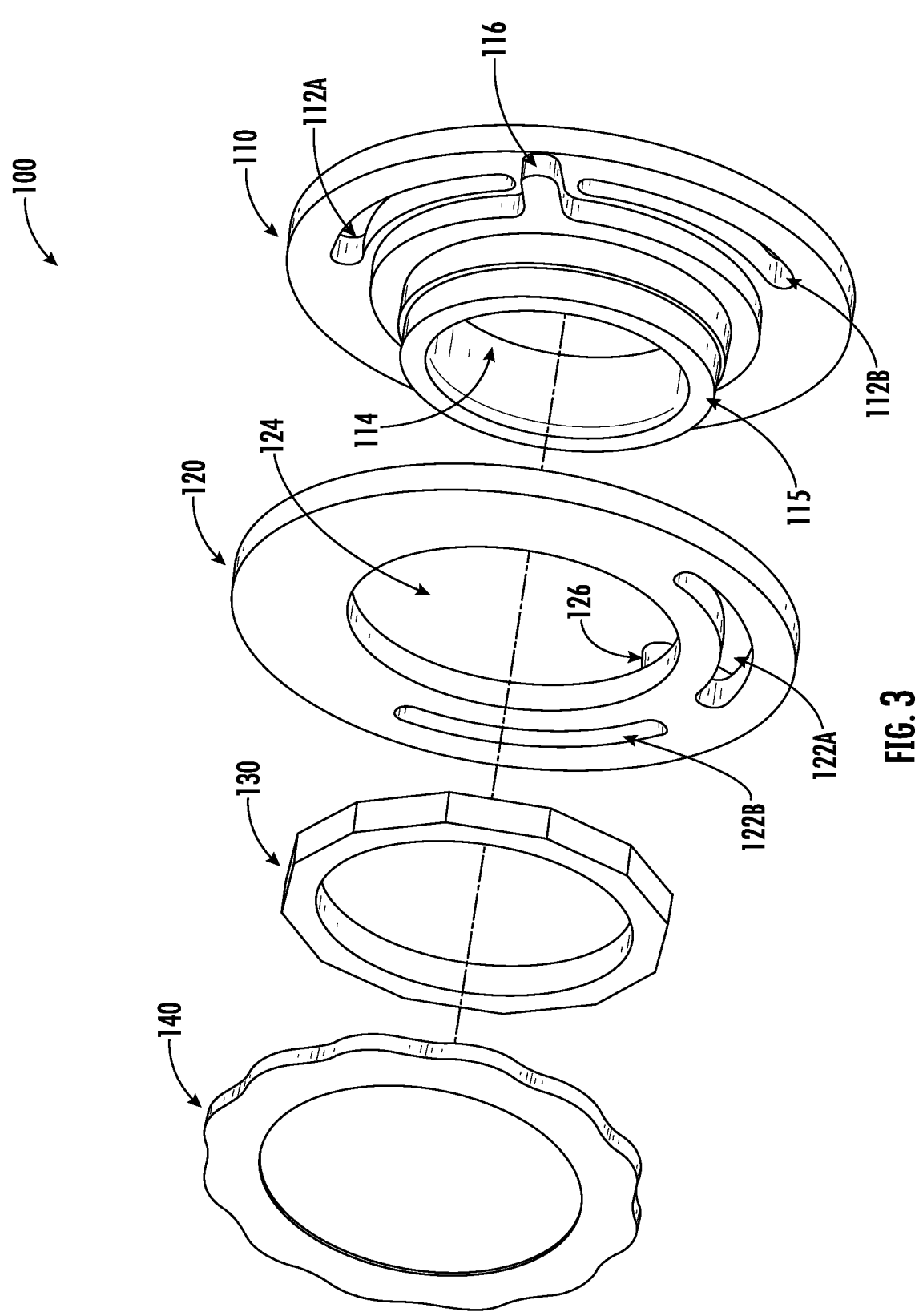
FIG. 3 illustrates an exploded view of various components of an exemplary relief apparatus in accordance with various embodiments.

As previously mentioned, the base plate 110 of the first relief apparatus 100 and the upper plate 120 of the first relief apparatus 100 provide a flexible connection point for straps of a harness, thereby improving overall flexibility and mobility of the harness, in some examples. As shown in FIG. 3, the base plate 110 comprises one or more base strap slots 112, and the upper plate 120 comprises one or more upper strap slots 122. In the illustrated embodiment, the base plate 110 specifically comprises two base strap slots 112A-B, and the upper plate 120 comprises one or more upper strap slots 122A-B. A base strap slot 112 and an upper strap slot 122 may be a channel, gap, open hole, aperture, and/or the like in the base plate 110 and the upper plate 120, respectively. In the illustrated embodiment, for example, the base strap slots 112 and the upper strap slots 122 are channels that follow the curvature of the outer perimeter of the base plate 110 and the upper plate 120, respectively.

Figure 4:
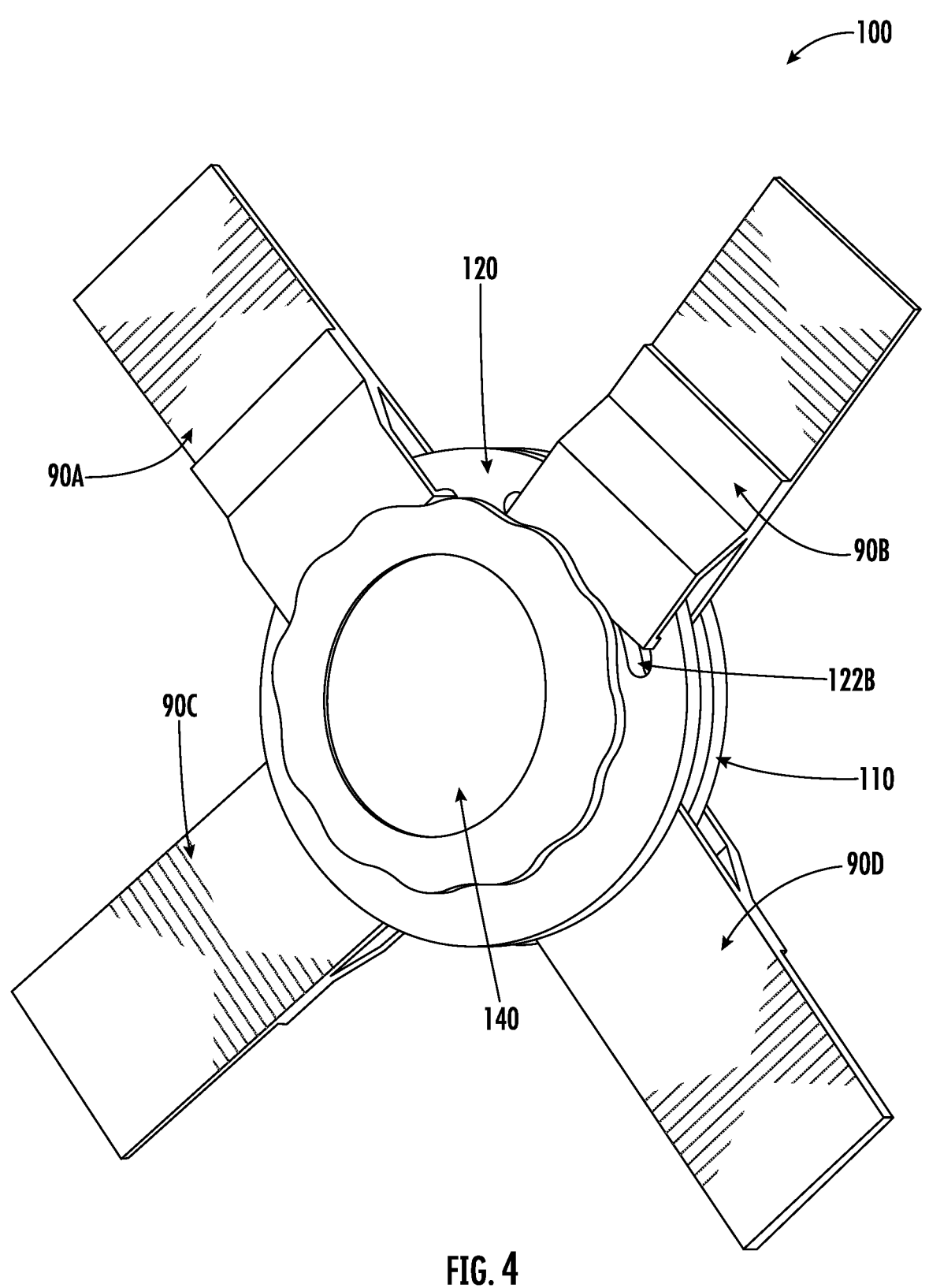
FIG. 4 illustrates another perspective view of an exemplary relief apparatus in accordance with various embodiments.

Each of the base strap slots 112 and the upper strap slots 122 is configured to secure a strap 90 of a harness to the first relief apparatus 100. A strap 90 may be positioned within and and/or through a base strap slot 112 or an upper strap slot 122. FIG. 4 illustrates four straps 90A-D each secured to a base strap slots 112 or an upper strap slot 122. In the illustrated embodiment, a portion of a strap 90 may be inserted through a base strap slot 112 or an upper strap slot 122 and connect with another portion of the strap 90 to form a loop through the base strap slot 112 or the upper strap slot 122.

The first relief apparatus 100 may act as a connection point between a number of straps 90 of a harness, with a first set of straps 90 being secured to the first relief apparatus 100 via base strap slots 112 of the base plate 110 and a second set of straps 90 being secured to the first relief apparatus 100 via upper strap slots 122 of the upper plate 120. In the illustrated embodiment of FIG. 4, the first relief apparatus 100 acts as a connection point between four straps 90A-D, where two straps 90A-B are secured to the upper plate 120 via upper strap slots 122A-B and two straps 90C-D are secured to the base plate 110 via base strap slots 112A-B. In some instances, the two straps 90A-B may be straps of an upper body portion of a harness, while the two straps 90C-D may be straps of a lower body portion of the harness. In various other instances, one strap 90 of an upper body portion of a harness and one strap 90 of a lower body portion of the harness may both be secured to the upper plate 120, while another strap 90 of the upper body portion of the harness and another strap 90 of the lower body portion of the harness may both be secured to the base plate 110. It will be appreciated that the first relief apparatus 100 may be configured as a connection point between any number of straps 90, and the straps 90 may be secured to the upper plate 120 and the base plate 110 in any configuration. Each of the straps 90 may extend from a base strap slot 112 or an upper strap slot 122 in a direction away from the central axis 50 (e.g., to extend around the user's body).

Returning to FIG. 3, the base plate 110 comprises a central cavity 114 defined by a protruding cavity wall 115, and the upper plate 120 comprises an aperture 124. In various embodiments, the protruding cavity wall 115 and the aperture 124 enable rotation of each of the upper plate 120 and the base plate 110 with respect to the central axis 50. This rotation of the upper plate 120 and the base plate 110 with respect to the central axis 50 may also be referred to as concentric rotation, rotation about the central axis 50, rotation around the central axis 50, and/or similar term used herein interchangeably. In various embodiments, the protruding cavity wall 115 protrudes in a distal direction from the base plate 110 (or in the positive direction of the central axis 50) and extends along the distal face of the base plate 110 in a substantially circular shape. Thus, in some embodiments, the central cavity 114 is defined to be substantially cylindrical. In various embodiments, at least the outer perimeter of the protruding cavity wall 115 is substantially circular, while the inner perimeter of the protruding cavity wall 115 may be of any geometry (e.g., have any number of edges and/or corners). Thus, in such embodiments, the protruding cavity wall 115 may have a non-uniform thickness (perpendicular to the central axis 50).

The substantially circular shape of the outer perimeter of the protruding cavity wall 115 in part enables the rotation of the base plate 110 and the upper plate 120 with respect to the central axis 50. In various embodiments, the aperture 124 of the upper plate is configured to match and fit around the protruding cavity wall 115 of the base plate 110. Specifically, an inner perimeter of the aperture 124 may be based at least in part on the outer perimeter of the protruding cavity wall 115. Accordingly, the upper plate 120 and the base plate 110 may be arranged such that the protruding cavity wall 115 (and the central cavity 114) are positioned within the aperture 124 of the upper plate 120. In various embodiments, the depth of the protruding cavity wall 115 (along the central axis 50) is greater than the depth of the upper plate 120. Accordingly, as the upper plate 120 and the base plate 110 are arranged to be adjacent along the central axis 50, the protruding cavity wall 115 extends distally past the upper plate 120. In various embodiments, the inner perimeter of the aperture 124 is configured based at least in part on the outer perimeter of a proximal portion of the protruding cavity wall 115, where the protruding cavity wall 115 has different thicknesses or diameters at different depths (along the central axis 50).

Thus, the connection point provided by the first relief apparatus 100 for various straps 90 may have flexibility and mobility based at least in part on the rotations of the upper plate 120 and the base plate 110 with respect to the central axis 50. Each of the upper plate 120 and the base plate 110 may rotate both clockwise and counter-clockwise with respect to the central axis 50. It should be understood then that rotation of the upper plate 120 and/or the base plate 110 correlates with translation of respectively connected straps 90 within a plane perpendicular to the central axis. In various embodiments, the base plate 110 and the upper plate 120 may independently rotate (e.g., base plate 110 rotates clockwise while the upper plate 120 rotates counter-clockwise, base plate 110 does not rotate while the upper plate 120 rotates clockwise, and/or the like), and as such, straps 90 connected to the upper plate 120 (e.g., straps 90A-B in the illustrated embodiment) may move independent from straps 90 connected to the base plate 110 (e.g., straps 90C-D in the illustrated embodiment). In various embodiments, concentric rotation of the upper plate 120 and the base plate 110 may be further enabled via various rotation features, including ball bearings, liquid lubricants or oils, low friction coefficient material (e.g., polytetrafluoroethylene or PTFE), anti-friction coating, and/or the like.

In various embodiments, the rotation of the upper plate 120 and the base plate 110 about the central axis 50 may be constrained or limited to a range of rotation angles. Such constraints may be configured to prevent straps 90 secured to the upper plate 120 from overlapping, intersecting, tangling, and/or the like with straps 90 secured to the base plate 110 during rotation. To constrain the rotation of the upper plate 120 and the base plate 110 with respect to the central axis 50, the base plate 110 comprises a base radial block 116, and the upper plate 120 comprises an upper radial block 126. Each of the base radial block 116 and the upper radial block 126 extend along a portion of the radius of the base plate 110 and the upper plate 120, respectively, and each are configured with a depth (along the central axis 50). The base radial block 116 is specifically positioned on the distal face of the base plate 110, while the upper radial block 126 is positioned on the proximal face of the upper plate 120. Accordingly, while the base plate 110 and the upper plate 120 are adjacent along the central axis 50, the base radial block 116 and the upper radial block 126 are co-planar within a plane perpendicular to the central axis 50.

During concentric rotation of the upper plate 120 and the base plate 110, the base radial block 116 may obstruct rotation of the upper plate 120 past a particular rotation angle, as the upper radial block 126 is obstructed from rotating past the base radial block 116. The upper radial block 126 may likewise obstruct the rotation of the base plate 110. In various embodiments, the base radial block 116 and the upper radial block 126 may each be positioned at a radial angle of the base plate 110 and the upper plate 120, respectively, based at least in part on the positions of the base strap slots 112 and the upper strap slots 122. In some embodiments, the base radial block 116 and the upper radial block 126 are each positioned to obstruct radial/rotation angles in which the upper strap slots 122 would overlap with the base strap slots 112. In general then, the base radial block 116 and the upper radial block 126 together constrain rotation of the upper plate 120 and the base plate 110 around the central axis 50.

FIG. 3 further illustrates the fixed ring 130. In various embodiments, the fixed ring 130 is configured to constrain or limit axial movement or translation of the upper plate 120 along the central axis 50, especially during rotation of the upper plate 120 around the central axis 50. Undesired movement or translation along the central axis 50 may be understood as axial slip. To limit such axial slip, the fixed ring 130 may be fixed to and rigidly attached to a portion of the protruding cavity wall 115 extending distally past the upper plate 120. Meanwhile, the width of the fixed ring 130 (perpendicular to the central axis) extends along a portion of the distal face the upper plate 120 to physically obstruct the upper plate 120 from axial slip. Thus, the upper plate 120 is physically bounded along the central axis 50 by the fixed ring 130 in a distal direction and by the base plate 110 in a proximal direction. In some embodiments, the fixed ring 130 may be rigidly fixed to the protruding cavity wall 115 via matching and/or interlocking threads positioned on an inner perimeter of the fixed ring 130 and on an outer perimeter of the protruding cavity wall 115. Additionally or alternatively, the fixed ring 130 may be rigidly fixed to the protruding cavity wall 115 via adhesive features.

Thus, as presently described, the first relief apparatus 100 provides a flexible connection point for straps 90 of a harness due in part to independent rotation of each of the upper plate 120 and the base plate 110 around the central axis 50. The first relief apparatus 100 further comprises a relief step 150 configured to provide physical relief for a user of a harness while suspended in the harness. In various embodiments, the first relief apparatus 100 comprises two relief steps 150, each relief step 150 intended to be used by one leg of the user.

Figure 5:
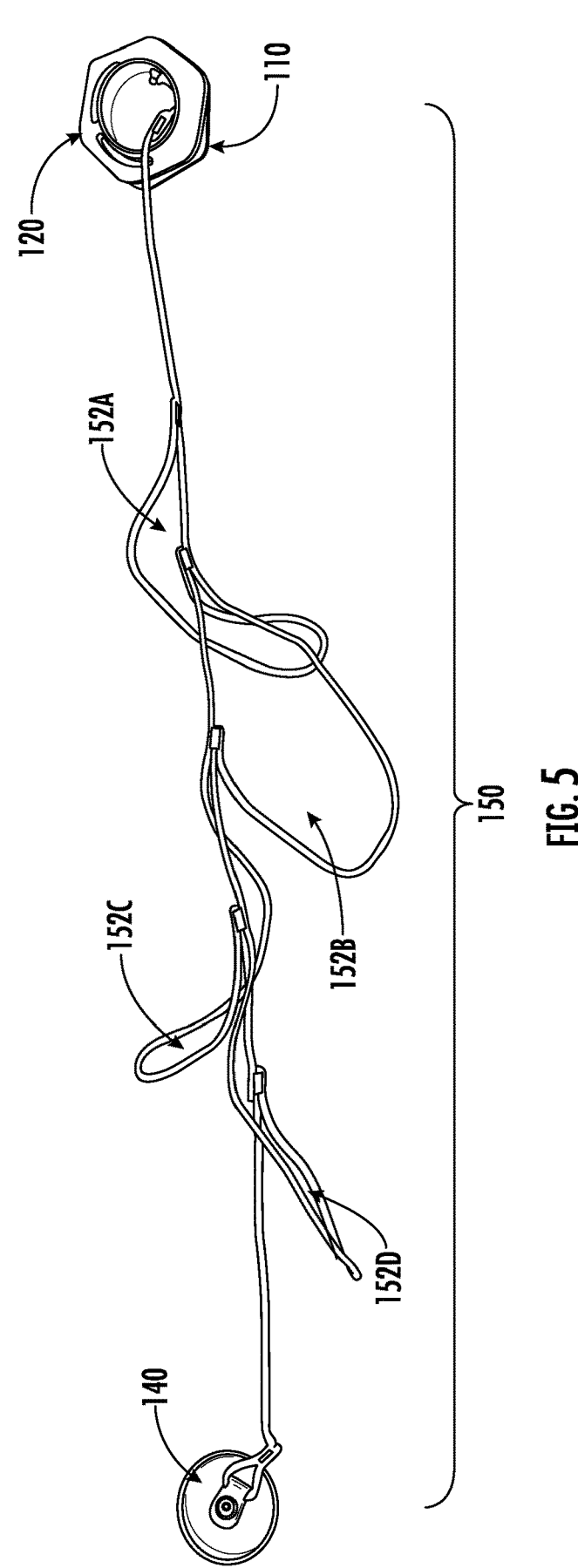
FIG. 5 illustrates a perspective view of various components of an exemplary relief apparatus in accordance with various embodiments.

As shown in FIG. 5, a relief step 150 may be comprised of a line of a configured length. In some embodiments, the relief step 150 may be of a length based at least in part on an approximated or average length of a user's leg. Specifically, a relief step 150 having a length less than a length of a user's leg enables physical relief and alleviates compression or pressure between the user's body and straps 90 of the lower body portion of a harness, such as straps surrounding or positioned around the user's waist, hips, groin, pelvic region, legs, and/or the like. In some embodiments, the length of the relief step 150 is configured to be approximately 5 cm less than the length of the user's legs. In other embodiments, the length of the relief step 150 is configured to at least 10 cm less than the length of the user's legs. In further embodiments, the length of the relief step 150 is configured to be at most 2 cm less than the length of the user's legs. In various embodiments, the length of the relief step 150 is adjustable. For example, a user may manually configure the length of the relief step 150 according to the length of his/her legs.

In the illustrated embodiment, the relief step 150 comprises one or more looped portions 152A-D. Each looped portion 152 may provide physical leverage for a user; for example, a user may insert a foot into a looped portion 152 and exert force against the looped portion 152 to displace the user's body from straps 90 of the lower body portion of a harness. It may be appreciated that such actions may also improve blood circulation of the user as the user flexes leg muscles to exert force against the looped portion 152. A looped portion 152 may be of a circumference or circumferential length allowing a user to insert a foot into the looped portion 152.

With a user exerting force on the relief step 150 (e.g., via a looped portion 152), the relief step 150 may be configured to withstand certain forces (e.g., stresses, tensions). For example, the relief step 150 is comprised of a line configured (e.g., with a particular material, with a particular diameter) with a strength of greater than 110 pounds. In some examples, the relief step 150 is comprised of a line configured with a strength preferably greater than 160 pounds. In further examples, the relief step 150 is comprised of a line configured with a strength preferably greater than 210 pounds. In various embodiments, the line of a relief step 150 is configured with a strength based at least in part on an approximated or average weight of a user of a harness. In some embodiments, the relief step 150 is configured to be slightly elastic. Additionally or alternatively, the relief step 150 is comprised of multiple lines intertwined, braided, and/or the like to provide a relatively higher collective strength.

Figure 6:
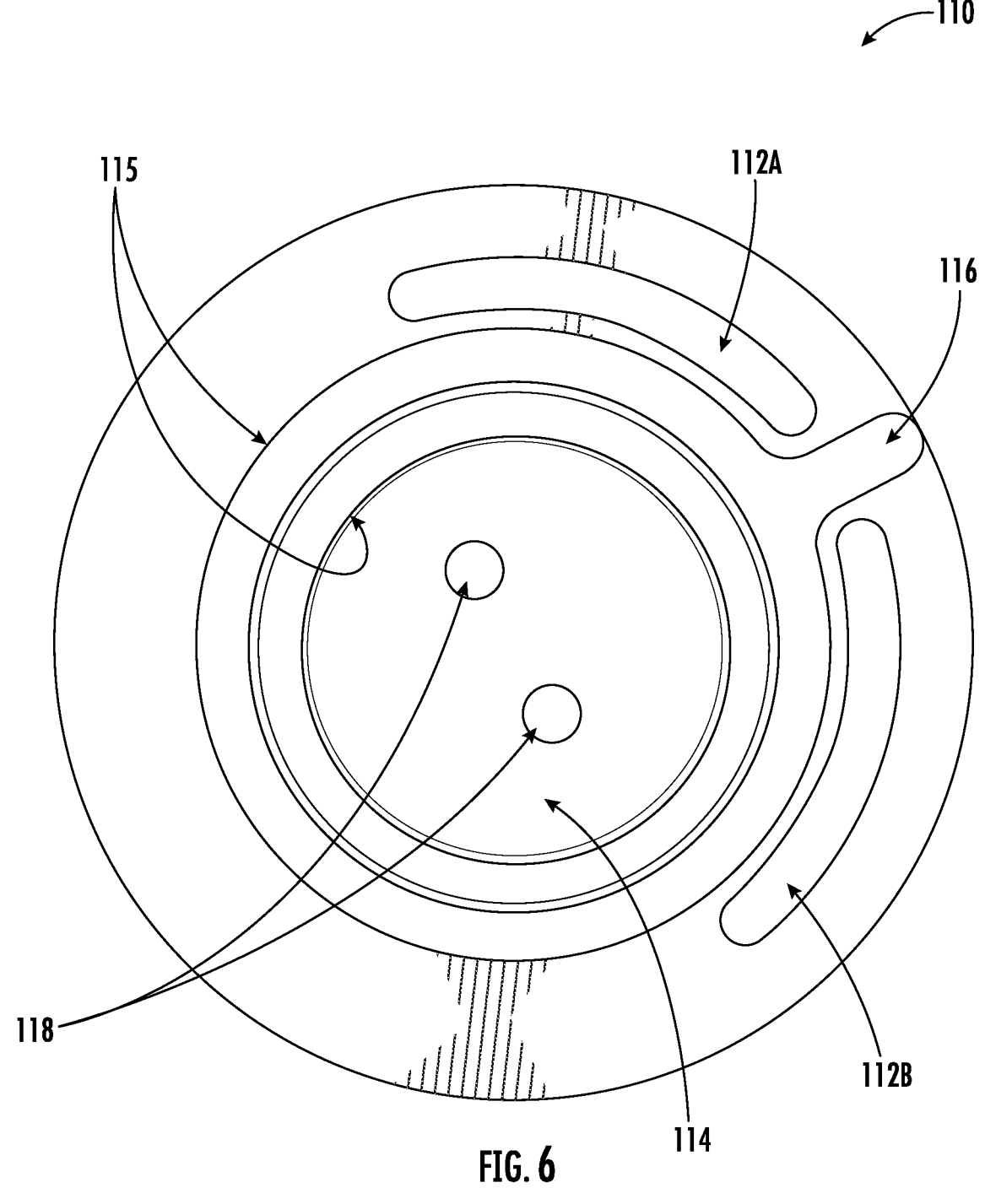
FIG. 6 illustrates a planar view of a component of an exemplary relief apparatus, in accordance with various embodiments.

In the illustrated embodiment, the relief step 150 comprises a proximal end and a distal end, and a proximal end of the relief step 150 is secured to the first relief apparatus 100 at the base plate 110. FIG. 6 illustrates a planar view of the base plate 110 comprising one or more proximal attachment features 118 via which the proximal end of the relief step 150 may be secured to the first relief apparatus 100. For example, the proximal attachment features 118 comprise two holes or apertures through which the proximal end of the relief step 150 may be inserted, looped, tied, adhered, or otherwise attached and secured.

Figure 7:
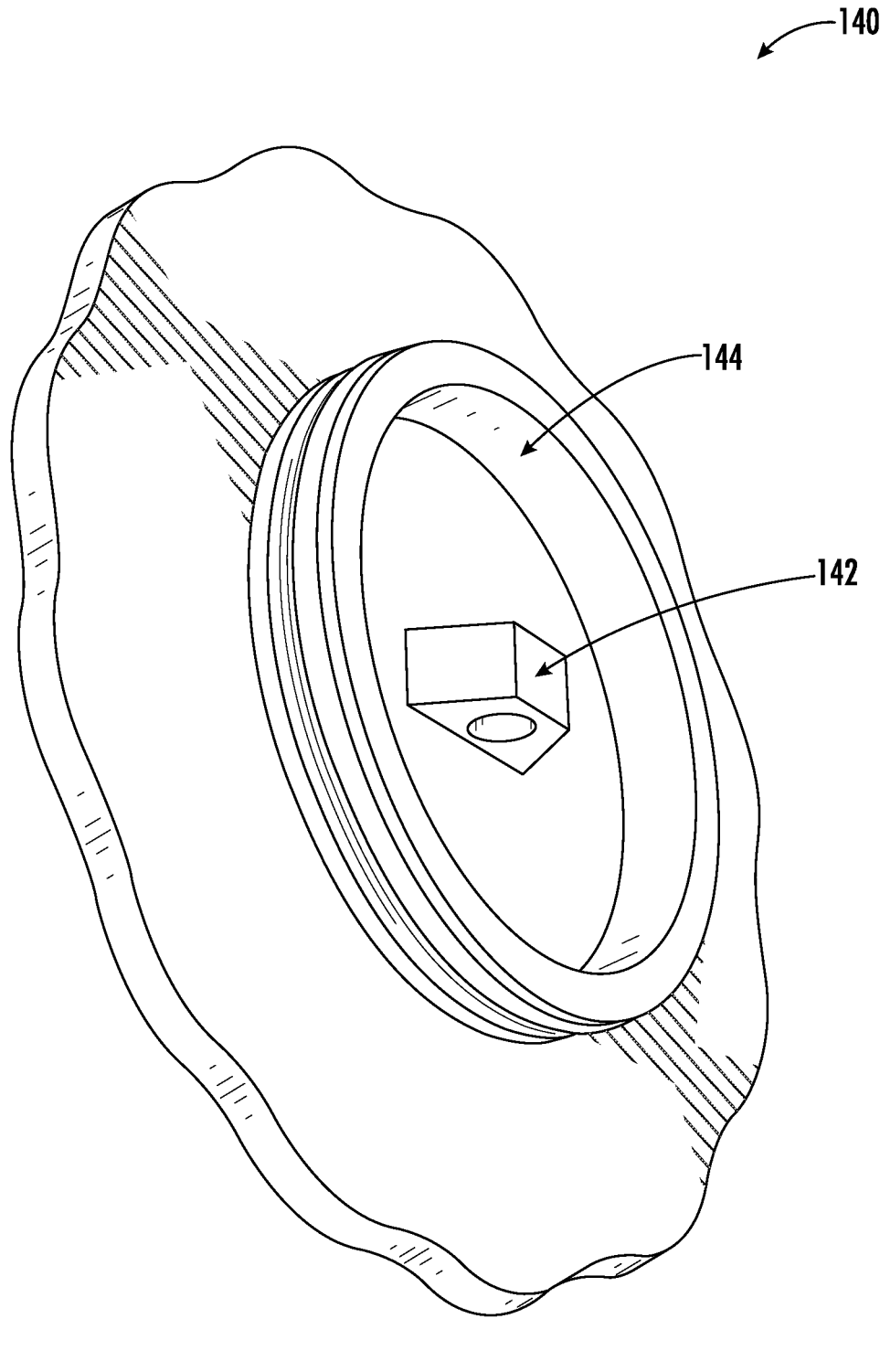
FIG. 7 illustrates a perspective view of a component of an exemplary relief apparatus, in accordance with various embodiments.

In various embodiments, the distal end of the relief step 150 may be secured to the first relief apparatus 100 at the deployment cap 140. As shown in FIG. 7, the deployment cap 140 may comprise a distal attachment feature 142 via which the distal end of the relief step 150 may be secured to the first relief apparatus 100. For example, the distal attachment feature 142 may be and/or may comprise a hole or aperture through which the distal end of the relief step 150 may be inserted, looped, tied, adhered, or otherwise attached and secured. As further illustrated in FIG. 7, the deployment cap 140 comprises an interfacing cap feature 144 enabling the deployment cap 140 to be secured with the other components of the first relief apparatus 100. In various embodiments, the interfacing cap feature 144 may be configured to interface with the protruding cavity wall 115 of the base plate 110. For example, the interfacing cap feature 144 may be a protruding wall or feature (protruding in proximal direction, or the negative direction of the central axis 50), and the outer perimeter of the interfacing cap feature 144 may be matched with the inner perimeter of the protruding cavity wall 115 of the base plate 110. In some embodiments, the interfacing cap feature 144 comprises threads configured to match and interface with threads positioned on the inside of the protruding cavity wall 115 of the base plate 110. In other embodiments, the inner perimeter of the interfacing cap feature 144 may be matched with the outer perimeter of the protruding cavity wall 115 of the base plate 110. In further embodiments, the interfacing cap feature 144 is a groove or a recessed portion within which the protruding cavity wall 115 of the base plate may be positioned to secure the deployment cap 140 with the base plate 110.

In an instance in which the deployment cap 140 is secured to the base plate 110 (specifically the protruding cavity wall 115 of the base plate 110), the central cavity 114 of the base plate 110 is an enclosed volume. Due to the distal end of the relief step 150 being secured to the deployment cap 140 and the proximal end of the relief step 150 being secured to the base plate 110, the relief step 150 may be confined and positioned in a compact or stored state within the central cavity 114. It will be understood then that the distal attachment feature 142 of the deployment cap 140 may be positioned on a proximal face of the deployment cap 140.

Description of structure and configuration of an example first relief apparatus 100 is thus presently provided. As described, the first relief apparatus 100 is associated with a first deployment mechanism for the relief step 150, which may be initially positioned in a compact and stored state within the central cavity 114 enclosed by the deployment cap 140 being secured to the base plate 110. In various embodiments, deployment of the relief step 150, or releasing the relief step 150 from the compact or stored state, may involve removal, unfixing, disconnecting, unsecuring, and/ or the like the deployment cap 140 from the base plate 110 such that the central cavity 114 is no longer enclosed. As previously described, various embodiments of the deployment cap 140 and the base plate 110 may comprise matching and/or interlocking threads such that the deployment cap 140 may be screwed from of the base plate 110 (or specifically the protruding cavity wall 115 of the base plate 110). Removal of the deployment cap 140 via screwing the deployment cap 140 may be further assisted or enabled by ridges positioned along an outer perimeter of the deployment cap 140, as illustrated in at least FIGS. 1, 3, and 7, such ridges enabling a user to leverage physical force tangent to the deployment cap 140 to assist or improve rotation.

It will be appreciated that removal of the deployment cap 140 and releasing the deployment cap 140 to gravitational force may quickly extend the relief step 150 to a full length, and thus, the first relief apparatus 100 with the first deployment mechanism enables rapid and efficient deployment of the relief step 150 to alleviate suspension trauma of a user before the user experiences serious harm, injury, or death. In various embodiments, the relief step 150 of the first relief apparatus 100 may be reused. That is, the relief step 150 may be repositioned in the compact or stored state after being released into the deployed state, and may iterate between the two states any desired number of times. In various embodiments, the deployment cap 140 may be re-secured and re-attached to the base plate 110. For example, the deployment cap 140 and the base plate 110 may comprise matching and/or interlocking threads, and thus, the deployment cap 140 may be re-secured to the base plate 110.

Additional Exemplary Relief Apparatus

According to various other embodiments of the present disclosure, a second relief apparatus is provided. Similar to the first relief apparatus 100, the second relief apparatus provides a flexible connection point between straps 90 of a harness and may further include a relief step, via which a user may mitigate and alleviate suspension trauma. The second relief apparatus is configured with a second deployment mechanism to enable a user to use the relief step. Various views of the second relief apparatus and components thereof are provided by FIGS. 8-12. Again, it will be understood that terminology such as "first" and "second" should not be construed to assign implied meaning or to describe some advantage or preference over other relief apparatuses described herein.

Figure 8:
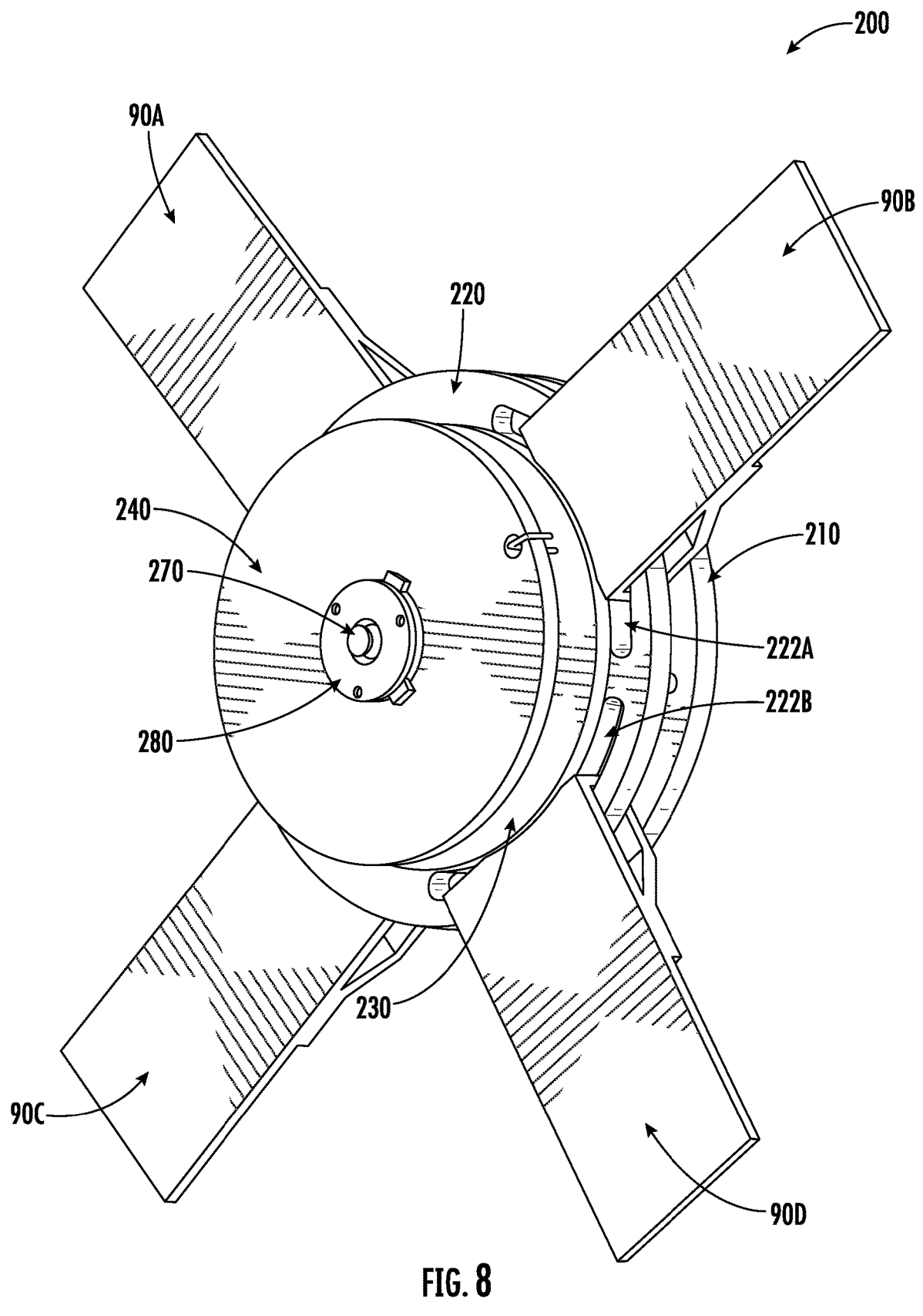
FIG. 8 illustrates a perspective view of an exemplary relief apparatus, in accordance with various embodiments.

FIG. 8 provides a perspective view of a second relief apparatus 200. In various embodiments, the second relief apparatus 200 is comprised of a base plate 210, an upper plate 220, a fixed ring 230, and a deployment ring 240. In reference to an example orientation of the second relief apparatus 200, the second relief apparatus 200 may be arranged with the base plate 210 being positioned nearest, or proximal, to the user's body and the deployment ring 240 being positioned further, or distal, to the user's body. In various embodiments, a proximal face of the upper plate 220 is adjacent to a distal face of the base plate 210, a proximal face of the fixed ring 230 is adjacent to a distal face of the upper plate 220, and the deployment ring 240 is distal to the fixed ring 230. In various embodiments, the base plate 210, the upper plate 220, the fixed ring 230, and the deployment ring 240 are substantially circular, and the second relief apparatus 200 may overall exhibit a substantially cylindrical shape. However, it will be understood that the outer perimeter of any of these components may be any geometry, including rectangular, pentagonal, hexagonal, and/or the like. FIG. 8 further illustrates the second relief apparatus 200 being comprised of a buckle button 270 and a cavity cover 280, with the cavity cover 280 being a distal-most component of the second relief apparatus 200.

Figure 9:
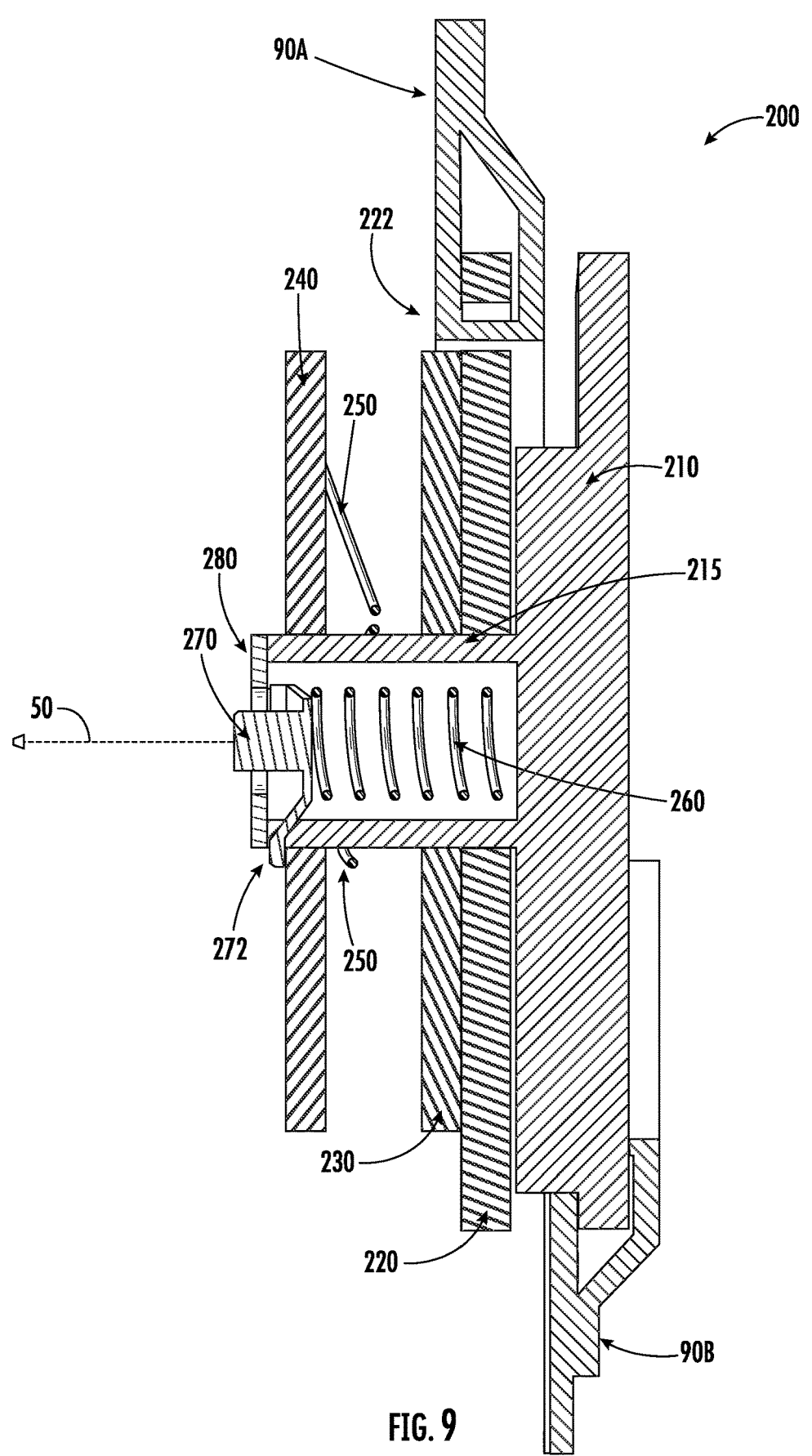
FIG. 9 illustrates a perspective view of an exemplary relief apparatus, in accordance with various embodiments.

FIG. 9 illustrates a cross-sectional view of the second relief apparatus 200 and shows that each component of the second relief apparatus 200 is concentrically aligned, thereby sharing a central axis 50. Combining the central axis 50 and the described example orientation, a positive direction of the central axis 50 correlates with a distal direction, and a negative direction of the central axis 50 correlates with a proximal direction. As can be seen from FIG. 9, at least a portion of the base plate 210, the upper plate 220, the fixed ring 230, and the deployment ring 240 may be substantially thin or planar with a minimal depth (along the central axis 50) relative to a width (perpendicular to the central axis 50).

Similar to the first relief apparatus 100, the second relief apparatus 200 is configured to provide a flexible connection point for straps 90 of a harness, where a first set of straps 90 may be secured to the base plate 210 and a second set of straps 90 may be secured to the upper plate 220. Specifically, straps 90 may be secured to base strap slots 212 and upper strap slots 222, illustrated in FIG. 10. A base strap slot 212 and an upper strap slot 222 may each be a channel, gap, open hole, aperture, and/or the like in the base plate 210 and the upper plate 220. A strap 90 may be inserted through, positioned within, or otherwise secured to a base strap slot 212 or an upper strap slot 222. Various straps may be secured to the base plate 210 and the upper plate 220 in any configuration. Referring again to FIG. 8 for example, one strap 90A of an upper body portion of a harness and one strap 90C of a lower body portion of the harness may be secured to base strap slots 212 of the base plate 210, while another strap 90B of the upper body portion and another strap 90D of the lower body portion may be secured to upper strap slots 222 of the upper plate 220, in an example embodiment.

In various embodiments, the base plate 210 comprises a central cavity 214 defined by a cavity wall 215, which interfaces with an aperture 224 of the upper plate 220. The cavity wall 215 may protrude distally from a distal face of the base plate 210. In various embodiments, the cavity wall 215 has a depth (along the central axis 50) greater than the depth of the upper plate 220 and accordingly extends distally past the upper plate 220. The central cavity 214 and the cavity wall 215 of the base plate 210 of the second relief apparatus 200 may have a relatively smaller diameter compared to the central cavity 114 and the cavity wall 115 of the base plate 110 of the first relief apparatus 100, as can be seen from FIG. 9. In particular, while the central cavity 114 may be configured with a diameter to allow for positioning of the relief step 150 within the central cavity 114 in a compact or stored state, a relief step for the second relief apparatus 200 may not be stored in the central cavity 214.

Interfacing of the cavity wall 215 and the aperture 224 enables concentric rotation of the upper plate 220 and the base plate 210, thereby providing flexibility to a connection point for various straps 90. In various embodiments, the inner perimeter of the aperture 224 may be substantially similar to the outer perimeter of the cavity wall 215, and the cavity wall 215 may be disposed within the aperture 224. With the cavity wall 215 being disposed within the aperture 224, the upper plate 220 may be arranged to be adjacent (along the central axis 50) to the base plate 210. The upper plate 220 and the base plate 210 each may rotate independently around the central axis 50 while being adjacent along the central axis 50.

Concentric rotation of the upper plate 220 and the base plate 210 may be enabled and/or assisted via various rotation features, including ball bearings, liquid lubricants or oils, low friction coefficient material, anti-friction coating, and/or the like. Meanwhile, concentric rotation of the upper plate 220 and the base plate 210 may be constrained or limited to certain rotation angle ranges using a base radial block 216 on the base plate 210 and an upper radial block 226 on the upper plate 220. Concentric rotation may be constrained or limited as such to prevent overlapping, intersecting, tangling, and/or the like of various straps secured to the second relief apparatus 200. In various embodiments, the base radial block 216 is disposed on a distal face of the base plate 210, and the upper radial block 226 is disposed on a proximal face of the upper plate 220, such that both the base radial block 216 and the upper radial block 226 are co-planar within a plane perpendicular to the central axis 50.

In various embodiments, the fixed ring 230 is configured to constrain or limit axial slip of the upper plate 220 during concentric rotation. The fixed ring 230 may be configured to fit around a portion of the cavity wall 215 distal to the upper plate 220. Specifically, the inner perimeter (e.g., circumference) of the fixed ring 230 is substantially similar to the outer perimeter (e.g., circumference) of the cavity wall 215. The fixed ring 230 may be rigidly fixed or secured to the cavity wall 215 such that the upper plate 220 is obstructed from distally moving or translating along the central axis 50 and the cavity wall 215 (parallel to or co-linear with the central axis 50). Thus, the upper plate 220 is physically bounded in a distal direction by the fixed ring 230 and in a proximal direction by the base plate 210.

As described, concentric rotation of the upper plate 220 and the base plate 210 enables flexibility of straps 90 secured to each of the upper plate 220 and the base plate 210. The second relief apparatus 200 further comprises a relief step 250 for providing physical relief for a user of a harness while suspended by straps 90 of the harness. Similar to the relief step 150 of the first relief apparatus 100, the relief step 250 of the second relief apparatus 200 may be comprised of a line of a configured length and may include looped portions against which a user may exert physical force. In some embodiments, the second relief apparatus 200 comprises two relief steps 250, each intended for use by one leg of the user.

As shown in FIG. 9, the relief step 250 may be positioned in a compact or stored state between the fixed ring 230 and the deployment ring 240. The deployment ring 240 is configured to fit external to and around a portion of the cavity wall 215. Specifically, the inner perimeter (e.g., circumference) of the deployment ring 240 is substantially similar to the outer perimeter of the cavity wall 215. In various embodiments, the deployment ring 240 is positioned distally from the fixed ring 230 by a depth such that the relief step 250 may be stored between the deployment ring 240 and the fixed ring 230. For example, the relief step 250 may be wrapped or wound around the cavity wall 215. Generally then, the cavity wall 215 has a depth greater than or equal to the individual depths of the upper plate 220, the fixed ring 230, the deployment ring 240, and a depth for wrapping or wounding the relief step 250.

Figure 10:
FIG. 10 illustrates a cross-sectional view of an exemplary relief apparatus in accordance with various embodiments.
Figure 10:
Figure 11:
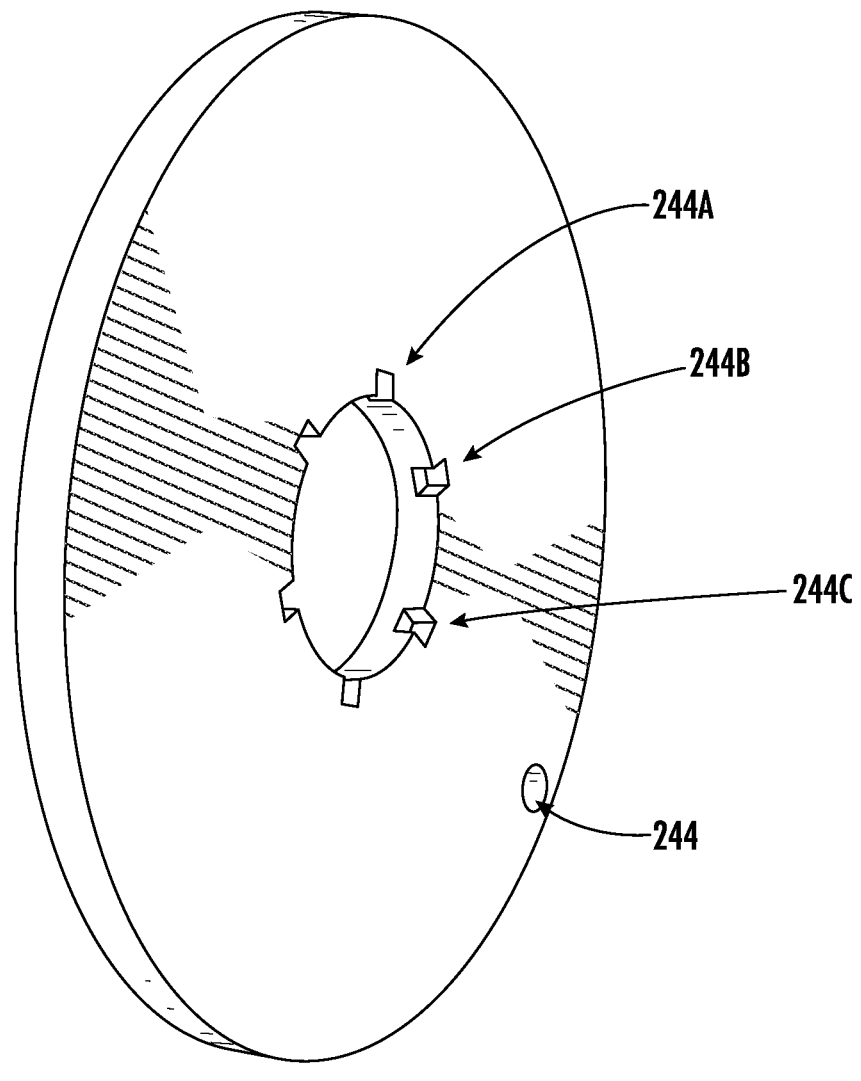
FIG. 11 illustrates an exploded view of various components of an exemplary relief apparatus in accordance with various embodiments.

FIG. 11 illustrates a perspective view of a proximal face of the deployment ring 240. In various embodiments, the fit of the deployment ring 240 and the cavity wall 215 is reinforced via ring notches 242, which are configured to interface with a wall block 218 (shown in FIG. 10). A ring notch 242 and the wall block 218 together limit rotation of the deployment ring 240 as well as axial slip of the deployment ring 240 in a proximal direction (a negative direction of the central axis 50). In various embodiments, a ring notch 242 may be a recessed portion or groove in the deployment ring 240, while the wall block 218 may be a protrusion of the cavity wall 215 (protruding perpendicularly away from the central axis 50). The deployment ring 240 may then be secured when the wall block 218 is positioned within and enclosed by a ring notch 242. In various embodiments, the ring notches 242 are positioned on an inner perimeter and a proximal face of the deployment ring 240.

As shown in FIG. 11, the deployment ring 240 may comprise more than one ring notch 242 and a distal attachment feature 244. In various embodiments, the relief step 250 comprises a proximal end and a distal end, and the distal end may be secured to the deployment ring 240 via the distal attachment feature 244. For example, the distal attachment feature 244 is a hole through which the distal end of the relief step 250 may be looped and secured. In various embodiments, the distal attachment feature 244 is positioned near the outer perimeter of the deployment ring 240 such that wrapping or wounding of the relief step 250 around the cavity wall 215 may be assisted or completed based at least in part on rotation of the deployment ring 240 around the central axis 50 (and the cavity wall 215).

After wrapping or wounding the relief step 250 around the cavity wall 215, a ring notch 242 of the deployment ring 240 is configured to interface with the wall block 218 to maintain the relief step 250 in the wrapped state, wound state, compact state, stored state, and/or similar terms used herein interchangeably. For example, a particular ring notch 242 is used to interface with the wall block 218 and secure the deployment ring 240 from rotation in order to maintain tension in the relief step 250 and/or to limit unwrapping or unwinding of the relief step 250. Accordingly, the deployment ring 240 comprises multiple ring notches 242 positioned along an inner perimeter and a proximal face, the multiple ring notches 242 being spaced throughout the entire inner perimeter so that any particular ring notch 242 may be available to interface with the wall block 218.

In various embodiments, the proximal end of the relief step 250 may be secured to the fixed ring 230. For example, the fixed ring 230 may also comprise a hole through which the proximal end of the relief step 250 may be looped and secured. In various other embodiments, the proximal end of the relief step 250 is secured perpendicularly to the cavity wall 215. Because the relief step 250 is wrapped or wound around the cavity wall 215 in the compact or stored state, the proximal end of the relief step 250 may preferably be secured to some portion or component of the second apparatus 200 exterior to the central cavity 214.

Figure 12:
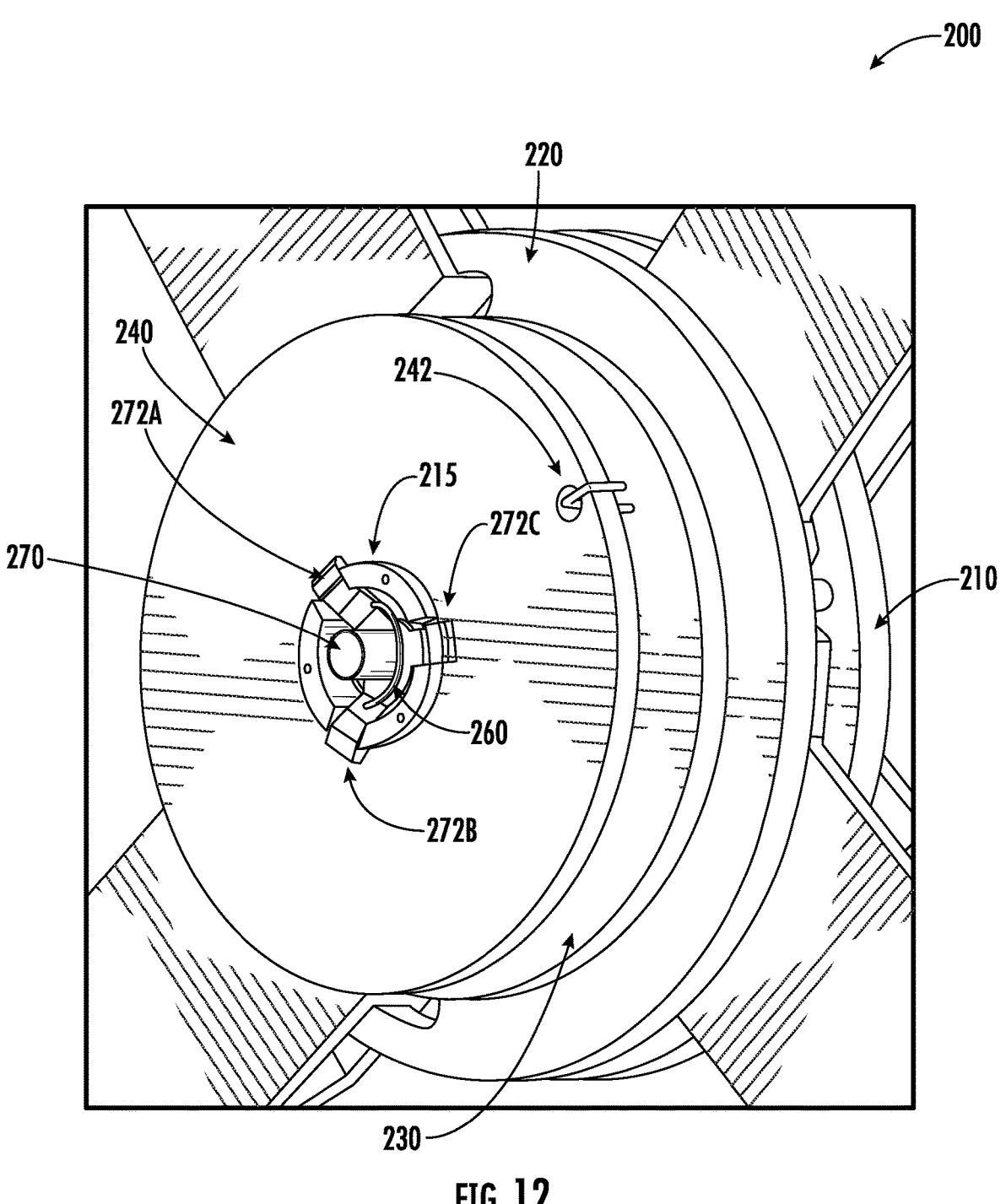
FIG. 12 illustrates a perspective view of a component of an exemplary relief apparatus.

It may be appreciated that the relief step 250, while in the compact state, is bounded in both the distal and the proximal direction of the central axis 50 by the deployment ring 240 and the fixed ring 230, respectively. While rotation of the deployment ring 240 is obstructed via a ring notch 242 and the wall block 218, axial slip of the deployment ring 240 in the distal direction is limited via a buckle button 270, as shown in FIG. 12. In various embodiments, the buckle button 270 is positioned within the central cavity 214 and comprises one or more buckle legs 272 that extend across a distal face of the deployment ring 240. In the illustrated embodiment, the buckle button 270 comprises three buckle legs 272A-C. In various embodiments, the cavity wall 215 comprises gaps such that while the buckle button 270 is positioned within the central cavity 214, the buckle legs 272 may extend from within the central cavity 214 to outside the central cavity 214 via said gaps. In various embodiments, the buckle button 270—and by extension, the deployment ring 240—is axially secured via a cavity cover 280, which is illustrated in FIGS. 8, 9, and 10. The cavity cover 280 encloses the central cavity 214 and encloses the buckle button 270 within the central cavity 214. In various embodiments, the cavity cover 280 is secured to the cavity wall 215 via screws and/or nails. In a particular example embodiment, the cavity cover 280 is secured to the cavity wall 215 via three screws. Altogether then, the deployment ring 240 is axially secured by the buckle button 270 and the cavity cover 280, thereby maintaining the relief step 250 in the compact or stored state.

As previously described, the second relief apparatus 200 is associated with a second deployment mechanism to release the relief step 250 from the compact state to a deployed state in which the user may use the relief step 250. FIG. 9 illustrates a spring 260 disposed within the central cavity 214 and proximal to the buckle button 270. Thus, within the central cavity 214, the spring 260 is positioned between a portion of the base plate 210 within the central cavity 214 and the buckle button 270. In some embodiments, the spring 260 may be disposed within the central cavity 214 in at least a slightly compressed state, thereby exerting a force on the buckle button 270 against the cavity cover 280. In various embodiments, spring 260 causes a portion of the buckle button 270 to protrude out of a cover hole 282 of the cavity cover 280.

As described, the buckle legs 272 of the buckle button 270 extend out from within the central cavity 214 (via gaps) across the distal face of the deployment ring 240 to axially secure the deployment ring 240. In various embodiments, the buckle button 270 is composed of flexible, malleable, soft, elastic, and/or the like material such that some deformation of the buckle legs 272 is achievable. The buckle button 270 may be also configured such that the buckle legs 272 are angled towards a positive direction of the central axis 50. Due to the material of the buckle button 270 and the angling of the buckle legs 272, the buckle legs 272 may retract back into the central cavity 214 (via the gaps) such that the deployment ring 240 is no longer axially secured. Specifically, the buckle legs 272 retract responsive to a force acting upon the portion of the buckle button 270 protruding out of the cover hole 282 of the cavity cover 280. For example, a user may exert a force (e.g., push) the buckle button 270 in a proximal direction against the spring 260 to retract the buckle legs 272. It may be appreciated that the spring 260 provides some resistance to forces that may retract the buckle legs 272. This may advantageously prevent accidental interactions with the buckle button 270 from inadvertently retracting the buckle legs 272.

Accordingly, with a force being exerted on the buckle button 270 against the spring 260 to retract the buckle legs 272, the deployment ring 240 may be free to move in a distal direction and slip off of the cavity wall 215. Such a removal of the deployment ring 240 from the cavity wall 215 results in the relief step 250 no longer being bounded and enables the relief step 250 to be released into a deployed state. For example, a user may remove the deployment ring 240 and release the deployment ring 240 to gravitational forces, which may result in the relief step 250 unwrapping and/or unwinding as the relief step 250 is connected at a distal end to the deployment ring 240.

Subsequent to deploying the relief step 250 (and possible use of the relief step 250), the relief step 250 may be re-positioned in the compact or stored state and thereafter reused. That is, the relief step 250 may be rewrapped or rewound around the cavity wall 215. The relief step 250 may then be resecured via the deployment ring 240. In various embodiments, the material of the buckle button 270 is somewhat elastic to an extent such that absent the force causing retraction of the buckle legs 272, the buckle legs may re-extend. Accordingly, to resecure the relief step 250, a user may again exert force on the buckle button 270 against the spring 260 to retract the buckle legs 272 and refit the deployment ring 240 onto the cavity wall 215 until the deployment ring 240 is at a depth along the cavity wall 215 past the gaps through which the buckle legs 272 extend. The refitting of the deployment ring 240 onto the cavity wall 215 may be done while maintaining the force on the buckle button 270 to keep the buckle legs 272 retracted due to the spring 260 exerting a force on the buckle button 270 in a distal direction. Once the deployment ring 240 is properly refitted and repositioned, the user may cease exerting the force on the buckle button 270 to then extend the buckle legs 272 to cause the deployment ring 240 to be axially secured.

The second relief apparatus 200 provides a relief step 250 that may transition between a compact or stored state and a deployed state for any number of iterations, allowing the second relief apparatus 200 to be reused repeatedly in providing physical relief for a user from straps 90 of the harness. In particular, this second deployment mechanism associated with the second relief apparatus 200 ensures that the relief step 250 is release responsive only to intentional and direct user actions. This is again accompanied by other functionality of the second relief apparatus 200, such as the provision of a flexible connection point between various straps 90 of the harness.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

17

The invention claimed is:

1. A relief apparatus comprising:

a base plate comprising one or more base strap slots and a central cavity defined by a cavity wall protruding out of a plane of the base plate;

an upper plate comprising one or more upper strap slots and an aperture extending through the upper plate, the aperture configured to fit around the cavity wall of the base plate with the cavity wall protruding through the aperture, wherein the base plate and the upper plate are arranged concentrically along a central axis; and a relief step comprised of a line and having a proximal end and a distal end, the distal end secured to a deployment feature.

2. The relief apparatus of claim 1, wherein an outer perimeter of the cavity wall is substantially circular.

3. The relief apparatus of claim 1, wherein the cavity wall is disposed within the aperture of the upper plate, and each of the base plate and the upper plate are configured to rotate about the central axis.

4. The relief apparatus of claim 3, wherein a depth of the cavity wall along the central axis is greater than a depth of the upper plate, and the upper plate is arranged adjacently to the base plate such that a portion of the cavity wall protrudes past the upper plate.

5. The relief apparatus of claim 4, further comprising a fixed ring arranged concentrically with the base plate and the upper plate and rigidly fixed to the portion of the cavity wall protruding past the upper plate limiting substantial translation of the upper plate along the central axis.

6. The relief apparatus of claim 3, wherein the base plate comprises a base radial block and the upper plate comprises an upper radial block, both the base radial block and the upper radial block being co-planar within a plane perpendicular to the central axis and constraining the rotation about the central axis of each of the base plate and the upper plate to a particular range of rotation angles.

7. The relief apparatus of claim 1, wherein the one or more base strap slots are configured to secure one or more first straps of a harness to the base plate, and the one or more upper strap slots are configured to secure one or more second straps of a harness to the upper plate.

8. The relief apparatus of claim 1, wherein a length of the relief step is adjustable.

9. The relief apparatus of claim 1, wherein the deployment feature is a deployment cap configured to interface with the cavity wall, and wherein the proximal end of the relief step is secured to a portion of the base plate within the central cavity.

10. The relief apparatus of claim 9, wherein the deployment cap comprises an interfacing cap feature protruding out of the deployment cap, the interfacing cap feature configured to interface with an inner perimeter of the cavity wall.

11. The relief apparatus of claim 10, wherein the interfacing cap feature comprises threads matching with threads of the cavity wall.

12. The relief apparatus of claim 11, wherein an outer perimeter of the deployment cap comprises a plurality of ridges providing leverage for forces acting to rotate the deployment cap.

13. The relief apparatus of claim 9, wherein the relief step is positioned in one of: (i) a compact state within the central cavity while the deployment cap is interfaced with the cavity wall, or (ii) an extended released state when the deployment cap is not interfaced with the cavity wall.

14. The relief apparatus of claim 1, wherein the deployment feature is a deployment ring configured to fit around the cavity wall of the base plate, and wherein the proximal end of the relief step is secured to a fixed ring rigidly fixed to a portion of the cavity wall protruding past the upper plate.

15. The relief apparatus of claim 14, wherein the deployment ring comprises one or more ring notches each configured to interface with a wall block positioned on the cavity wall, the interfacing of a ring notch with the wall block limiting substantial rotation of the deployment ring about the central axis.

16. The relief apparatus of claim 14, further comprising:

a spring positioned within the central cavity along the central axis, and a buckle button positioned within the central cavity along the central axis distal relative to the spring, the buckle button comprising one or more button legs extending across a face of the deployment ring to limit substantial translation of the deployment ring along the central axis.

17. An apparatus providing a flexible connection point between straps of a harness, the apparatus comprising:

a base plate comprising one or more base strap slots and a central protrusion protruding out of a plane of the base plate, wherein the central protrusion is substantially circular; and an upper plate comprising one or more upper strap slots and an aperture configured to fit around the central protrusion of the base plate, wherein:

the base plate and the upper plate are arranged concentrically such that at least a portion of the central protrusion is positioned within the aperture, the upper plate is configured to rotate about the central protrusion, and the central protrusion includes a cavity configured to receive a relief step therein.

18. A relief apparatus comprising:

a base plate comprising one or more base strap slots and a central cavity defined by a cavity wall protruding out of a plane of the base plate;

an upper plate comprising one or more upper strap slots and an aperture configured to fit around the cavity wall of the base plate, wherein the base plate and the upper plate are arranged concentrically along a central axis; and a relief step comprised of a line and having a proximal end and a distal end, the distal end secured to a deployment feature, wherein the deployment feature is a deployment ring configured to fit around the cavity wall of the base plate, and wherein the proximal end of the relief step is secured to a fixed ring rigidly fixed to a portion of the cavity wall protruding past the upper plate.

19. The relief apparatus of claim 18, further comprising:

a spring positioned within the central cavity along the central axis, and a buckle button positioned within the central cavity along the central axis distal relative to the spring, the buckle button comprising one or more button legs extending across a face of the deployment ring to limit substantial translation of the deployment ring along the central axis.

20. The relief apparatus of claim 19, wherein the one or more button legs are configured to retract to enable substantial translation of the deployment ring along the central axis, wherein retracting of the one or more button legs is responsive to a force acting upon the buckle button against the spring.

* * * * *